United States Patent [19]
Street

[11] Patent Number: 5,373,335
[45] Date of Patent: Dec. 13, 1994

[54] CELLULAR IMAGES AND ASSOCIATED APPARATUS AND PROCESSING METHOD

[76] Inventor: Graham S. B. Street, Impstone House, Pamber Road, Silchester, Reading, Berkshire RG7 2NL, Great Britain

[21] Appl. No.: 50,077

[22] PCT Filed: Nov. 1, 1991

[86] PCT No.: PCT/GB91/01920
§ 371 Date: May 5, 1993
§ 102(e) Date: May 5, 1993

[87] PCT Pub. No.: WO92/08164
PCT Pub. Date: May 14, 1992

[30] Foreign Application Priority Data
Nov. 6, 1990 [GB] United Kingdom ............... 9024043

[51] Int. Cl.⁵ .......................................... G03B 35/00
[52] U.S. Cl. ..................................... 354/112; 355/22
[58] Field of Search .................. 354/112, 115; 355/22; 359/619, 621, 622, 623, 628

[56] References Cited

U.S. PATENT DOCUMENTS 4,494,864  1/1985  Smith et al. .......................... 355/22

FOREIGN PATENT DOCUMENTS 138602   4/1985  European Pat. Off. .
8501593  4/1985  WIPO .

*Primary Examiner*—Howard B. Blankenship

[57] ABSTRACT

An image array comprising a cellular structure, typically comprising three-dimensional image data and apparatus for forming such an array, typically on photographic film. Each cell within the array comprises an image component and a reference mark formed by the same element of a microlens array. By use of the reference marks, the film may be separated from the lens array and image processed with improved flexibility and precision.

26 Claims, 7 Drawing Sheets

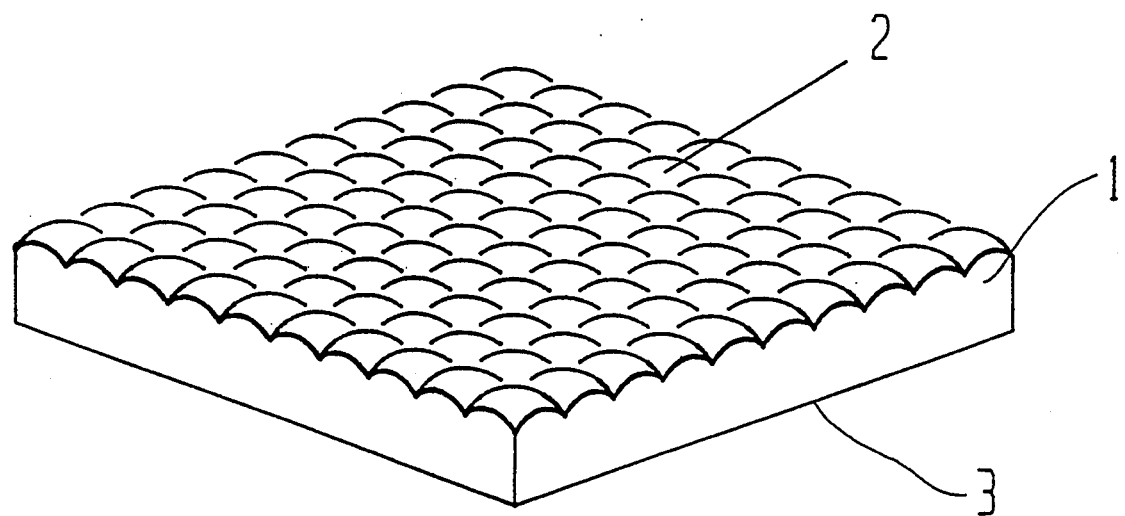
Fig.-1-
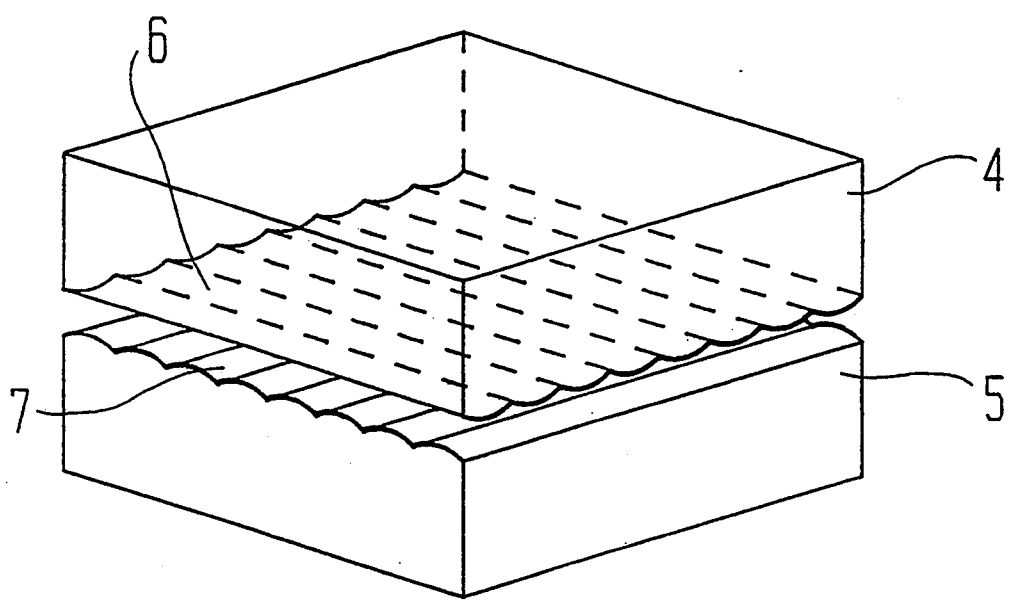
Fig.-2-

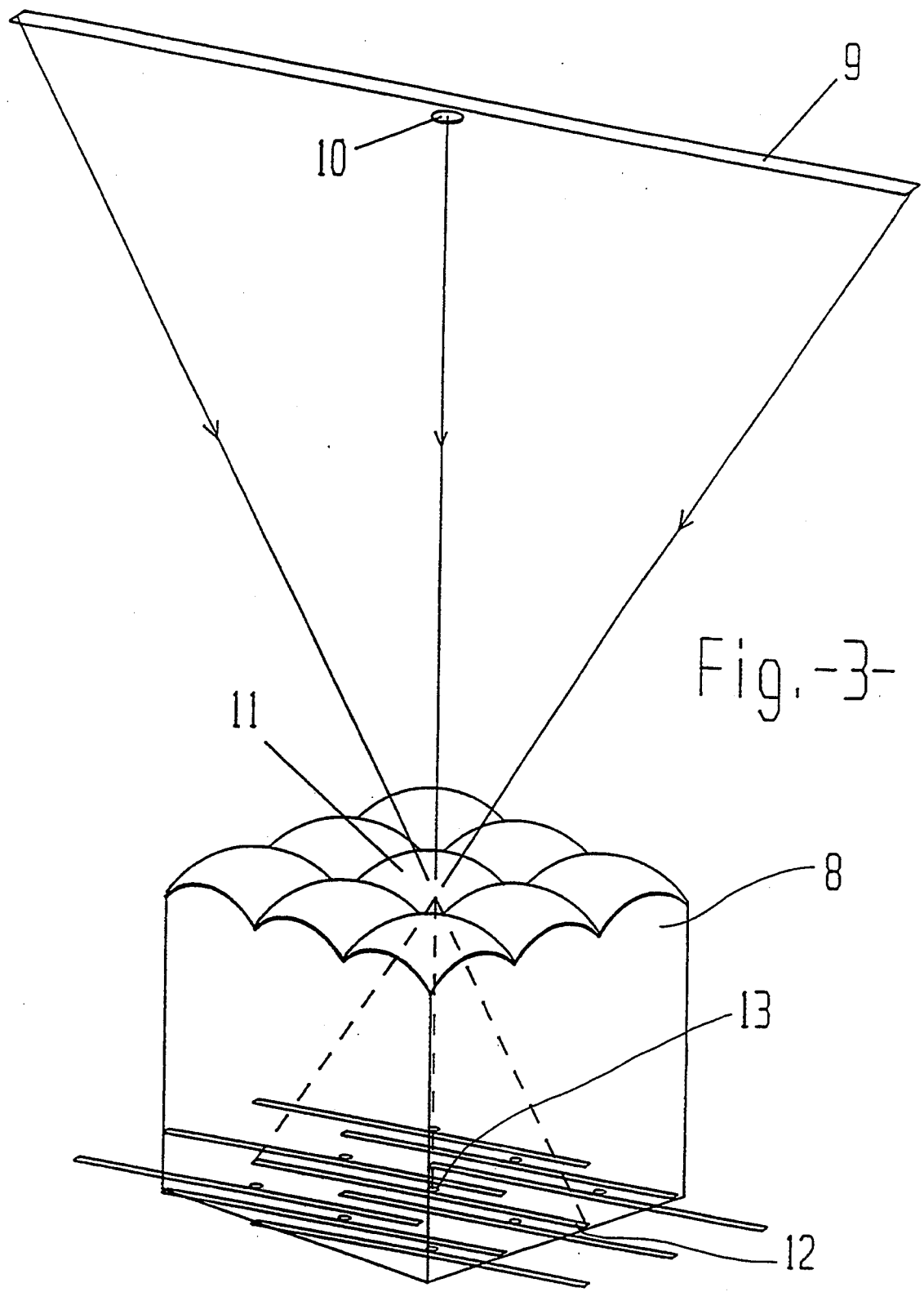
Fig.-3-

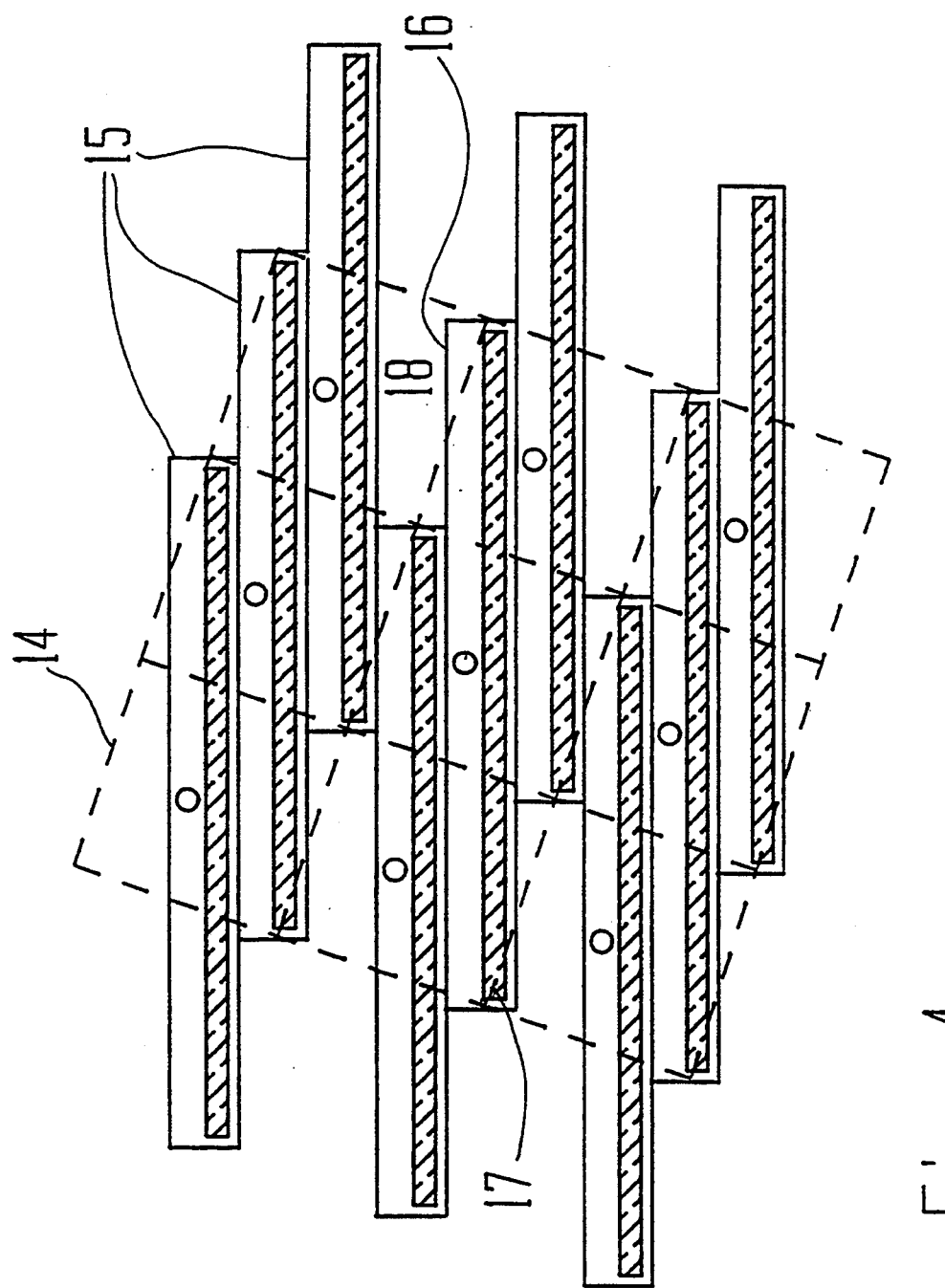
Fig. -4-

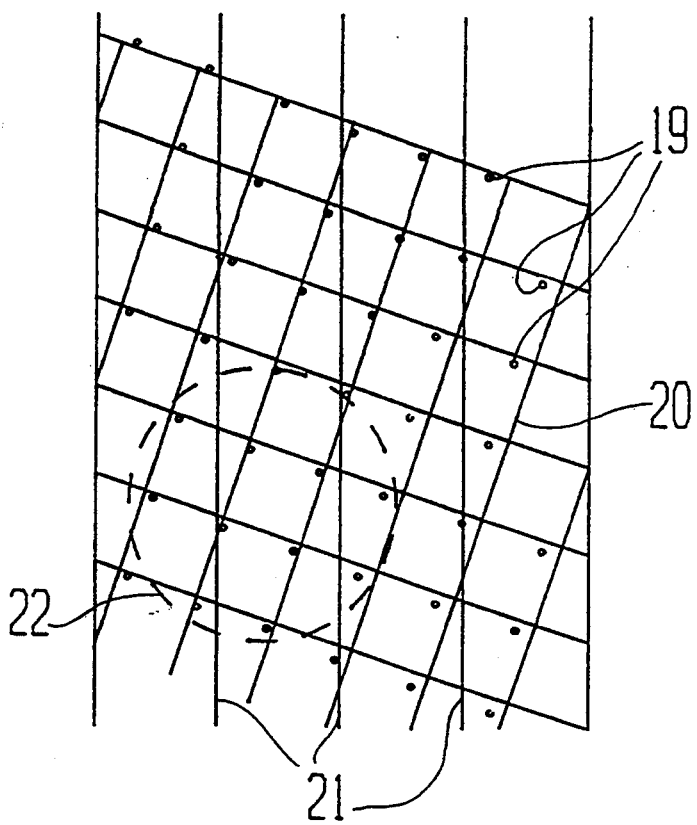
Fig.-5a-
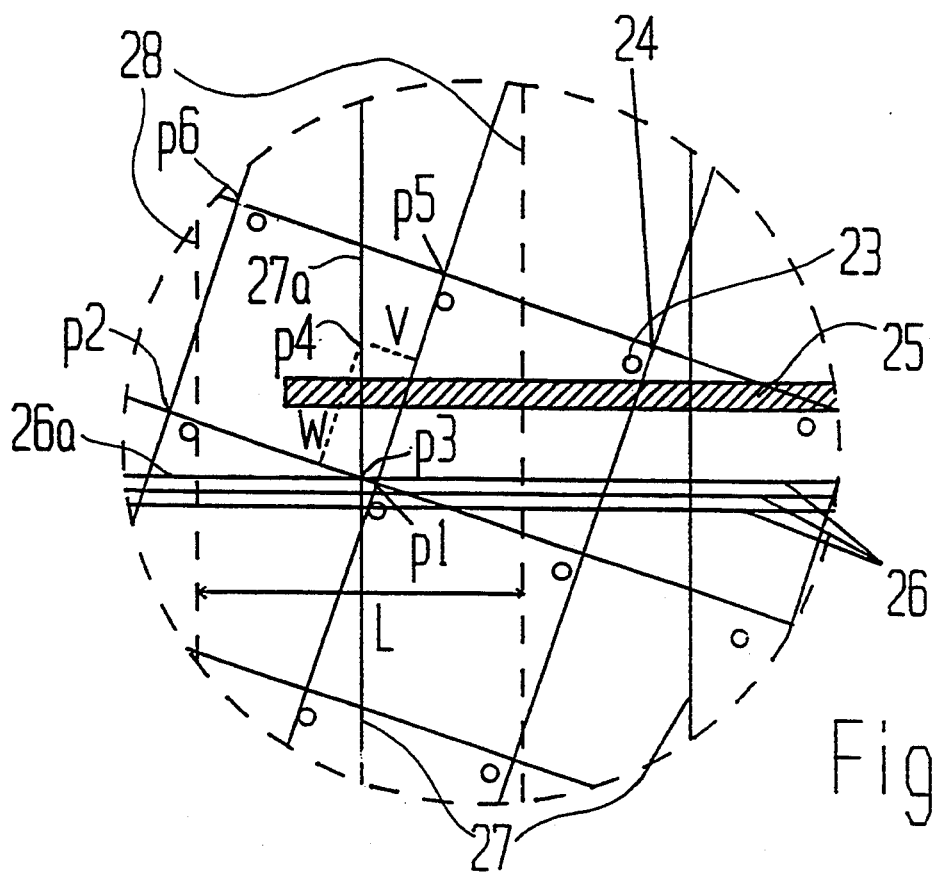
Fig.-5b-

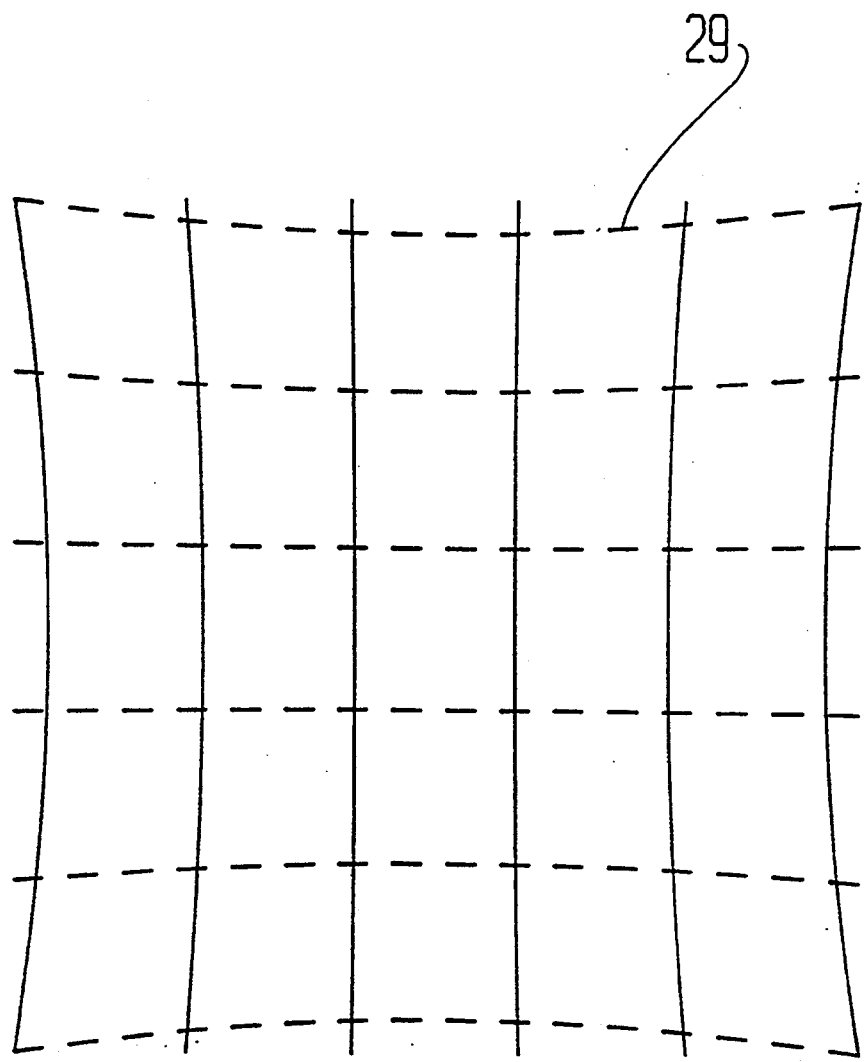
Fig. - 6 -

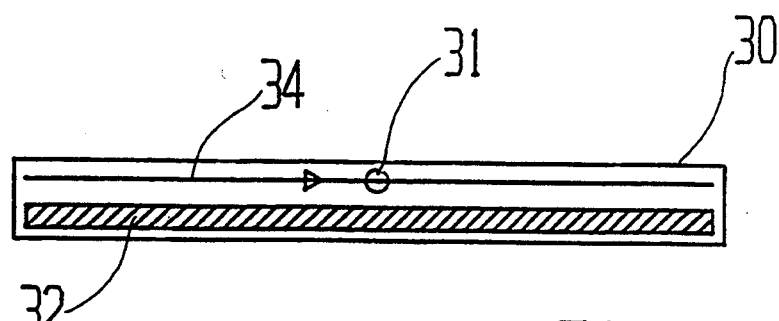
Fig. - 7a -
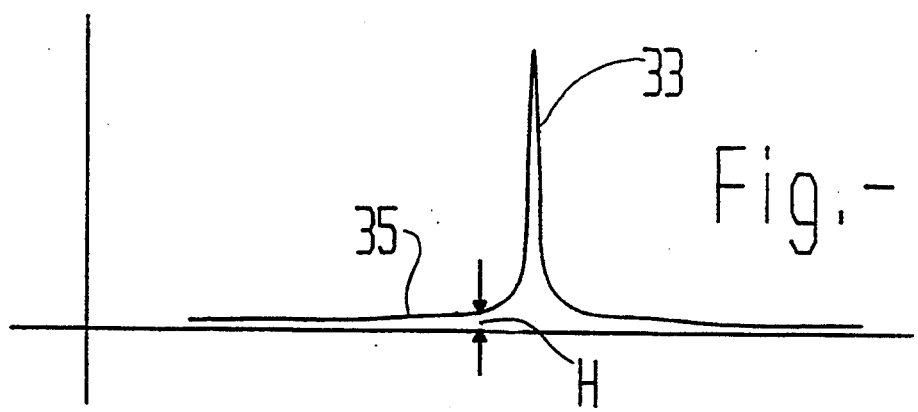
Fig. - 7b -
Fig. - 7c -
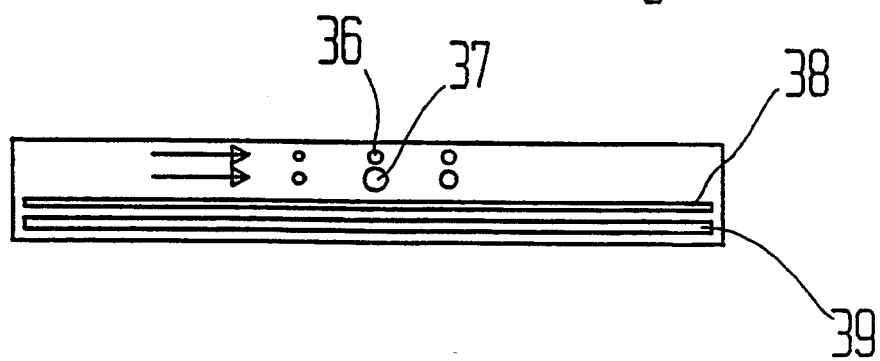

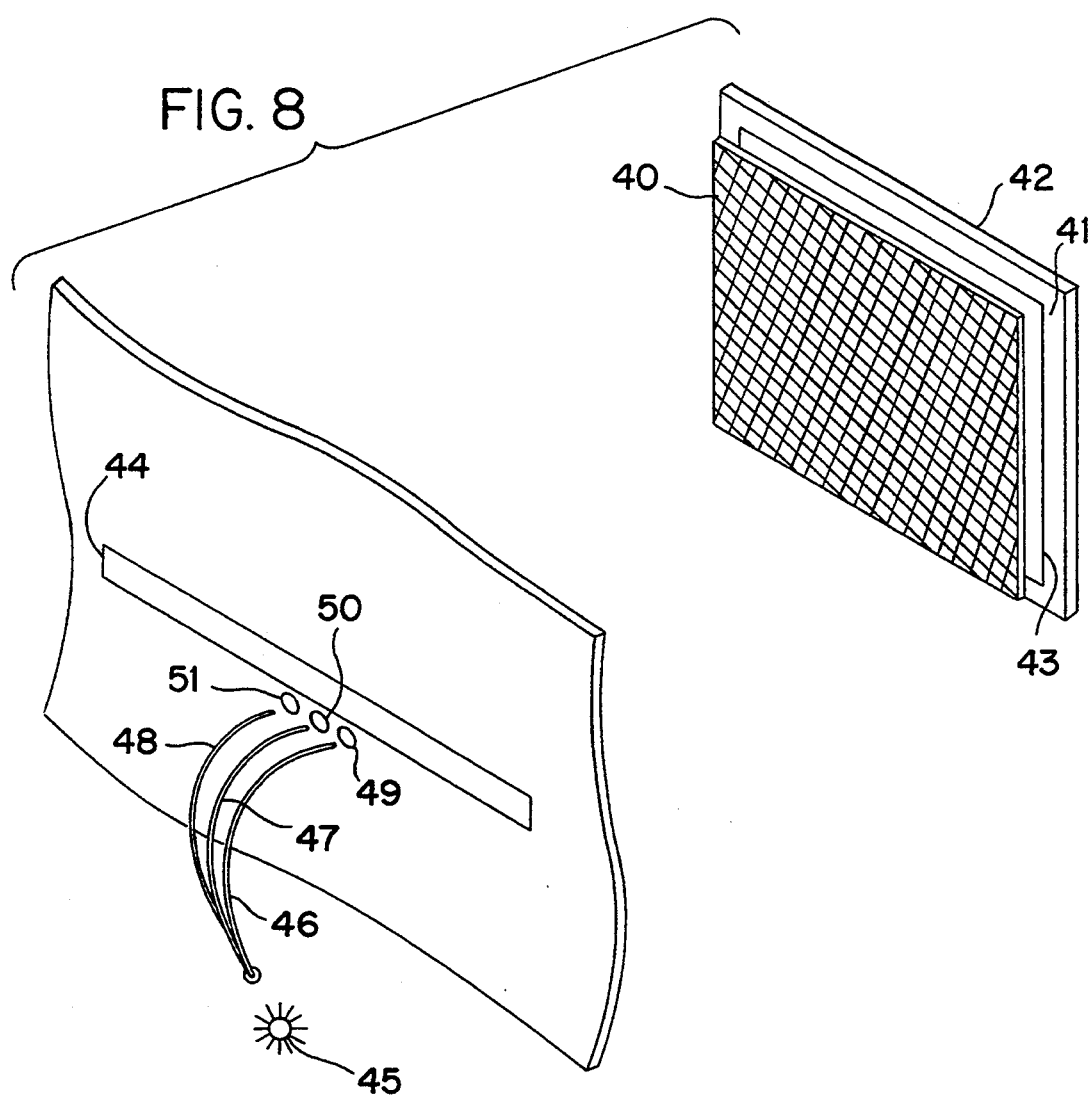

CELLULAR IMAGES AND ASSOCIATED APPARATUS AND PROCESSING METHOD

BACKGROUND OF THE INVENTION

This invention relates to the formation and use of images which comprise a cellular structure and suitable apparatus. Inter alia this includes the field of three-dimensional imaging in which an array of lens elements is employed to form or view a corresponding array of image components or cells.

The use of a lenticular screen comprised of cylindrical lens elements or a two-dimensional array of microlenses as a component in forming and/or displaying an autostereoscopic image is well known. U.S. Pat. No. 4,552,442 (Street) provides an imaging system for the recording of such an image, whilst U.S. Pat. No. 4,668,063 (Street) provides an intermediate record of an autostereoscopic image comprised of an array of elongate elements each of which comprises a range of perspectives along its length and substantially less or no perspective range in the orthogonal direction. Each of these elongate elements may be regarded as an image of the taking camera's aperture. The array of co-ordinates of the centres of these elongate image elements corresponds to the array of co-ordinates of the microlenses used in their formation. It is an object of U.S. Pat. No. 4,668,063 to provide an intermediate record for use with a purpose designed optical printer or enlarger to produce a viewable three-dimensional image.

SUMMARY OF THE INVENTION

An object of the current invention is to provide a modified form of an intermediate record which may be separated from the array of microlenses used to form it and processed in a number of ways to generate images in a more flexible manner than can be achieved with an optical transfer system alone.

The main advantages of the current invention include:

a) the use of conventional film both in the camera and at the end-print or transparency stage of production;

b) compensation for distortion introduced by film processing and/or subsequent enlargement;

c) gamma correction for film exposure non-linearities;

d) compensation for the effects of stray light and other imperfections in the microlens array used to form the intermediate image.

Thus, according to the present invention, there is provided a cellular image array comprising a plurality of distinct image components arranged in an array extending in one or two dimensions and a second corresponding and distinct array of reference components displaced with respect to said image component array, both said arrays being formed in the same photosensitive recording medium so that the displacement between each said image component and its respective reference component is substantially the same for every image component of said image component array.

Preferably each image component and its respective reference component are created by exposing the recording medium through the same element of an array of convergent optical elements. Said two exposures may occur simultaneously or consecutively.

The two dimensional array of convergent optical elements may comprise the combination of two one dimensional arrays of cylindrical lenses in which the optical axis of one cylindrical array has been arranged to be substantially orthogonal to that of the other array so that, in use, a single element of said two dimensional array is formed by the region of intersection of one element from each cylindrical array.

In certain embodiments of the invention, each said image component comprises a discreet or continuous plurality of picture elements. Each picture element may represent a single picture element of a substantially single perspective of a recorded image, said image comprising a plurality of perspectives.

A single resolution element of an image component may represent a colour component of a single picture element of a recorded image.

A single resolution element of an image component may be one of a plurality of different representations of a single picture element of a recorded image.

According to a further aspect of the invention, a method of processing a cellular image array comprises pixelating said image with a pixel or image point rasterising or scanning system, detecting the location of a plurality of reference components within an array of said reference components in the image data, relating each image component within said image data to its respective reference component in said data, and, following suitable co-ordinate transformations, combining data from a plurality of said image components into an extended array of image elements to comprise in use an image field for subsequent viewing, transmission and/or storage.

Preferably, each reference component comprises a characteristic pattern or reference mark recorded within a well defined elemental area, said area being unambiguously associated with said reference component.

The co-ordinate transformation may in certain preferred embodiments comprise a mapping of the pixelated data so that each reference mark maps onto a geometrically predetermined array or grid. A similar co-ordinate transformation is subsequently applied globally to the image components to force these onto a corresponding grid.

In certain embodiments the predetermined grid is a precise regular array. In other embodiments said grid is pre-distorted in order to allow for the distortions of an image transfer system such as an optical enlarger.

In addition each image component may be transformed locally to select the required image data from said component and, optionally, neighbouring components, and to fill the image field with useful image data for subsequent viewing. Said local transformation may comprise a geometric transformation, density mapping and/or the combination of a selection of the available data from one or more image components in a variety of different ways.

In embodiments where an image component comprises a plurality of different perspective representations of a portion of a three-dimensional image field, said local transformation may comprise reversing the sequence of said plurality of perspective representations so that, in use, a pseudoscopic recording may be viewed orthoscopically.

The invention further provides for a reference mark or pattern to have an internal geometric structure and density profile. This may correspond to the integrated shape, brightness and colour structure of the source used to expose said reference mark during the period of said exposure and/or the image transfer characteristics of the convergent element which forms said reference mark by imaging said source onto the recording medium.

In a preferred embodiment the geometry and density profile of the reference mark provides the image transfer characteristics of the convergent element corresponding thereto, and this information is used to deconvolute its respective image component so that, in use, said image component is modified to take into account said transfer characteristics.

BRIEF DESCRIPTION OF THE DRAWINGS

The invention will now be described by way of example with reference to the accompanying drawings, in which:

FIG. 1 is a perspective view of an array of microlenses.

FIG. 2 illustrates the formation of a two-dimensional array of convergent optical elements by the combination of two one-dimensional arrays of cylindrical elements.

FIG. 3 shows, schematically and in accordance with the invention, a small part of a microlens array in relation to the taking aperture of a camera and a reference light source.

FIG. 4 shows in plan view the arrangement of image and reference components of the resulting exposure and how these are positioned relative to the array of microlenses in accordance with the invention.

FIG. 5a illustrates the geometric relationship between a cellular image array formed in accordance with the invention and a lenticular structure for use in displaying an autostereoscopic image derived therefrom.

FIG. 5b shows an enlarged detail of FIG. 5a.

FIG. 6 illustrates the type of distortion which may be introduced by an imaging system.

FIGS. 7a through 7c illustrate aspects of the scanning process of a three-dimensional record formed in accordance with the invention.

FIG. 8 is a schematic representation of apparatus in accordance with the invention.

DESCRIPTION OF THE PREFERRED EMBODIMENTS

In FIG. 1 an array 1 of microlenses is shown. Element 2 forms an image at the back surface 3 of array 1 which may carry or be in contact with photographic emulsion (not shown).

FIG. 2 shows how the array of FIG. 1 may be replaced in use by two cylindrically lenticulated screens 4 and 5. The axes of the cylindrical lens elements are arranged to be orthogonal to each other so that, in use, the area of overlap between a typical lens element 6 of screen 4 and another lens element 7 of screen 5 forms a composite lens element with imaging properties similar to the typical element of the array of FIG. 1. Whereas the microlenses of FIG. 1 may be arranged in a variety of different configurations including a square or close-packed hexagonal array, the arrangement of FIG. 2 is most suited to a square or rectangular regular array.

In U.S. Pat. No. 4,668,063 a method of using a regular array of microlenses is described. The axes of the array may be tilted with respect to the long axis of the aperture of a camera suitable for recording three-dimensional images. FIG. 3 shows a small portion of such a lens array 8 and how this is arranged in accordance with the invention (but not to scale) relative to both the taking aperture of such a camera 9 and, displaced from this by a small distance, a secondary source of light 10. Each element of the array (such as microlens 11) forms an image on a recording medium (not shown) both of the taking aperture 9 (which may in practice be synthesised over time by a sequence of smaller apertures or a scanning aperture) and the reference source 10. Microlens 11 forms a strip image 12 of aperture 9 and a reference mark 13 which is an image of reference source 10. These exposures need not be simultaneous but are made with the recording medium (typically photographic film) in the same position relative to the lens array or, if not in the same position, then in a very well defined relative position.

The particular arrangement of strip images formed by the lens array is illustrated in more detail in FIG. 4 and provides a particularly useful format in order to optimise the use of the resolving capability of the photographic emulsion whilst mitigating the numerical aperture requirements of the microlenses for a given camera aperture length. Other arrangements are possible, for instance by altering the tilt of the array relative to the camera aperture and/or the geometric arrangement of microlenses. In FIG. 4 the outline 14 of a 3×3 array of square microlenses is shown in broken line. Each of these lens elements has a portion of the photographic emulsion associated with it. This is shown as a series of rectangles 15. Thus, the central lens element has an area of emulsion represented by the lower half of rectangle 16 within which to form an image. This image is shown to comprise a stripe 17 containing a portion of the image representing a three-dimensional record. Typically this stripe contains a series of perspective representations of a picture element (or pixel) of a three-dimensional image. A plurality of pixel values contained within a single stripe of this type may, in combination, conveniently be regarded as a super-pixel. The image within the upper half of rectangle 16 includes a reference mark 18 representing the image of the reference source 10 (FIG. 3), and the entire three-dimensional record consists of two interleaved arrays. The first comprises an array of image components containing all the image data associated with the three-dimensional subject matter. The second comprises an array of reference components or areas, each with a reference mark having a well defined geometric relationship with that portion of the image data formed by the microlens by which the mark was formed.

It now follows that the photographic emulsion may be separated from the microlens array and, following photographic processing, the recorded image can be converted into data suitable for image processing by the application of established raster scanning techniques or any other suitable image digitisation process. Each reference mark or point is easy to identify as it forms part of a regular array of nearly identical features on an essentially unexposed background. That portion of the total record representing image data, such as stripe 17, may now easily be extracted from the scanned data and related to its reference point (i.e. the centre of mark 18 for stripe 17). The process requires little more than identifying the two end co-ordinates of stripe 17 by relating these to the position of mark 18 and the orientation of the array of such marks.

The invention thus provides for a method of relating three-dimensional pixel data to a well defined grid of points, namely the centres of the array of microlenses which formed the record. Each pixel may be regarded as having a luminance, hue and saturation value which varies as a function of angle of viewing. As an alternative representation, RGB values may be used. Hence the $j^{th}$ pixel in the $i^{th}$ row of the image can be represented as, $$P_{ij}(\Theta) = \{P_{ijR}(\Theta), P_{ijG}(\Theta), P_{ijB}(\Theta)\},$$

in which the $P_{ijR}(\Theta)$, $P_{ijG}(\Theta)$ and $P_{ijB}(\Theta)$ represent the variation with $\Theta$ (viewing angle) of the R, G and B values of that pixel. $\Theta$ will vary over the range of viewing angles recorded in the image and, instead of each pixel being a simple 3 component vector quantity, it must now be regarded as a 3 component vector function of $\Theta$ (or, in fact, a super-pixel).

The invention further provides for the use of this vector function field in a system for producing a viewable three-dimensional image from this data. Typically, though not necessarily, such a viewable image would comprise a lenticular screen with vertical cylindrical lens elements, at the focal plane of which would be situated the relevant image information. FIG. 5a shows, schematically, three geometric structures in combination. The array of reference marks 19 of the recorded image is shown displaced and somewhat distorted with respect to the points of intersection of skew square grid 20. These intersection points represent the expected co-ordinates of the reference marks and correspond to the centres of the respective microlens elements forming them. The grid should not be confused with the outline of the lens elements shown in broken line in FIG. 4. The data analysis method described in the foregoing allows for a relocation of any image data to the co-ordinates of the relevant intersection point of grid 20. The third geometric structure is shown as a series of equispaced vertical lines 21, which represent the centrelines of the vertically running interdigitated image stripes corresponding to the cylindrical lens elements of the lenticular screen through which, in certain embodiments, the final image is to be viewed.

An enlarged portion of region 22 is shown in FIG. 5b. The centre of reference mark 23 is mapped onto the intersection point 24 of the skew square grid corresponding to the microlens array in the picture recording process. By definition, the image data partly shown as the hatched region 25 and stored as a vector function of the form already described, is assigned to have the co-ordinates of point 24.

Image data is a format suitable for output may now be provided in accordance with the invention in several ways. Firstly, by setting $\Theta$ to a particular value in each pixel vector function $P_{ij}(\Theta)$, a specific two-dimensional perspective of the image may be selected. Such perspectives may accordingly be presented sequentially to a stereo-multiplexing system. An example of such a system is provided by U.S. Pat. No. 4,552,442 in which, for example, a computer may be used to present a series of perspectives of a scene sequentially and a three-dimensional image may thus be constructed for subsequent viewing.

An alternative method of using the three-dimensional pixel vector field provided by the invention is achieved by transforming the image data within the computer into the format required by the lenticular screen or similar device to be used for viewing and by outputting this onto film using a colour film recorder of the type already used in electronic imaging applications. Such film recorders typically write an image with a very small spot of light (25 microns or less) onto a 10"×8" area in a raster fashion. The closely spaced horizontal lines 26 represent a small portion of such a raster scan. The solid vertical lines 27 correspond to lines 21 in FIG. 5a, whereas the dashed vertical lines 28 midway between them may be regarded as the boundaries between individual image regions associated with the respective vertical lenticular elements of the viewing screen. The composition of a single scan line 26a having the width of the recorder's resolution is achieved by a mapping of the field of super-pixels, held by the computer, onto positions such as the intersection point of scan line 26a and vertical line 27a. The section of line 26a between lines 28 and of length L is now used to record the variation with $\Theta'$ (the new viewing angle) of the new pixel vector field, $$P'_{nm}(\Theta') = \{P'_{nmR}(\Theta'), P'_{nmG}(\Theta'), P'_{nmB}(\Theta')\}$$

A given displacement from the centre-line 27a of a scan line element within length L will be viewed at a specific angle $\Theta'$ through the lenticular screen. It should be noted that the new pixel vector field $P'_{nm}(\Theta')$ now relates to the $m^{th}$ scan line of the film recorder and the $n^{th}$ lenticular element of the viewing screen. In order to derive a suitable mapping function for this vector field from the original $P_{ij}(\Theta)$ field, representing the input image data, a simple transformation of pixel data based on a nearest neighbours algorithm may be used. In particular, scan line 26a crosses the skew square grid on a line between grid points p1 and p2 at point p3. Using the notation that u is the ratio of the distance between p3 and p1 to that between p2 and p1, a useful algorithm for the new value $P'_{p3}(\Theta')$ is, $$P'_{p3}(\Theta') = uP_{p2}(\Theta) + (1-u)P_{p1}(\Theta)$$

For an arbitrary position along line 27a such as p4, a more complex formula involving the values of $P_{ij}(\Theta)$ at the four points p2, p3, p5 and p6 may be used. Thus, a suitable transformation would be, $$P'_{p4}(\Theta') = vw \cdot P_{p6}(\Theta) + (1-v)w \cdot P_{p5}(\Theta) + (1-v)(1-w) \cdot P_{p1}(\Theta) + v(1-w) \cdot P_{p2}(\Theta)$$

in which v and w are the respective ratios of the perpendicular distances V and W from p4 to the grid interval in the direction of the line joining p1 and p5 and that joining p1 and p2 respectively. Naturally, the most mixing occurs in the centre of a grid square where $v = w = \frac{1}{2}$.

In FIG. 6 a distorted grid 29 is shown. This represents an exaggerated example of the kind of distortion introduced by a lens system, such as might be used in a photographic enlarger. The mapping operation described in the foregoing may be used to map points onto a pre-distorted set of lines so that, when the interdigitated image has been recorded and developed, these distortions cancel out those of the enlarger and a precisely registered lenticular screen, essential for good three-dimensional reconstruction, is maintained.

An advantage of electronic imaging is the flexibility that this allows between the image taking and the reproduction or hard copy step. It will be evident that, as in conventional image processing, the pixel vector field (array of super-pixels) $P_{ij}(\Theta)$ may be modified to correct for colour balance, gamma and other film characteristics. In addition, artefacts such as a deliberate vignette may be introduced or the contrasts altered to improve the overall quality of the image. Specifically, other three-dimensional or two-dimensional imagery (e.g. graphics) may be added to the image prior to output.

Under certain circumstances, imperfections in the microlens array may be accommodated as may limitations in the dynamic range of the photographic emulsion. This is illustrated with the aid of FIGS. 7a through 7c.

In FIG. 7a box 30 represents the area of emulsion associated with a particular microlens in the picture taking process. Reference mark 31 has associated with it an image stripe 32. In scanning this area of the emulsion, the centre of the reference mark is located by establishing the centre of gravity of the peak 33 shown in FIG. 7b and representing the scan data corresponding to line 34 in FIG. 7a passing through the centre of mark 31. Scan lines adjacent to line 34 will probably show similar peaks of reduced height.

Most lens arrays generate certain levels of stray light, typically from the boundaries between elements. With images of high contrast this can lead to ghosting. The effect of such errors can be significantly reduced by parameterising the process and correcting for it. For example, the height H of pedestal 35 may be directly caused by stray light (for clarity this has been exaggerated). By relating the light which has generated the pedestal to that forming the image of the reference mark, a transformation may be derived which mitigates the effects of bright areas on surrounding darker ones. If the reference mark is the image formed by a microlens of substantially a point source then a more general process would be to use the entire form of the reference mark to provide a deconvolution function with which to remove to a substantial degree any undesirable mixing or blurring effects caused by the lens elements on the image data.

Another embodiment of the invention addresses the limitations of dynamic range and related resolving power of the photographic emulsion. FIG. 7c shows a double exposure of both the image stripe and reference mark. In this example the reference mark has been split into three distinct elements, one for each primary colour of the emulsion. Instead of a single reference source 10 as in FIG. 3, three distinct sources placed side-by-side and providing red, green and blue separate references are used. The splitting of the green mark into two components 36 and 37, the latter of which is significantly brighter (shown larger) and possibly larger in fact than the former, results from a modified structure of the microlens (not shown). In the example given, the microlens has two image forming components, the optical axes of which have a small relative displacement causing the separation of the resulting two images. One imaging component is arranged to be significantly smaller than the other (or alternatively less efficient) and accordingly less light contributes to the formation of the corresponding image. Such a structure may be formed using different techniques. For example, a diffracting pattern within the lens structure could generate a weaker distinct image. Alternatively, a photo-polymer may be exposed with a suitable pattern to form a regular array of refractive index variation and providing the required optical elements. Diamond machining may also be used to shape a tool from which a hybrid lens array may be moulded. In addition to the splitting of the reference marks, the image stripe is itself recorded at two different levels of intensity. This provides the opportunity to scan the bright components of the image in the less exposed stripe 38 and stripe 39 is used vice versa.

The embodiments of FIGS. 7a and 7c lend themselves to a further benefit. The reference source may be composed of respectively one or three fibre optic sources (in the case FIG. 7c each of the three incorporating a different colour filter to match the characteristics of the emulsion's colour coupling dyes). The input end of the fibre may be supplied with light from the source used to light the subject matter being photographed. As a result the reference marks recorded will carry the necessary information to address any required colour correction as part of the image processing algorithms.

The preferred embodiments of this invention which have been illustrated are based on the use of a two-dimensional array of microlenses or an equivalent optical array. In general, however, the basic principles of this invention may be applied to the case where a conventional cylindrically lenticulated screen is used in the image origination step. In such a case there should be gaps unexposed by image data between the image portions associated with each vertically orientated lens element. These unexposed strips would be identified within the scanned data and form the basis for constructing the three-dimensional pixel vector field as described above. In this case the reference marks if present would be long lines between image portions and the light source for these would be placed to one side of the camera's aperture instead of above or below as illustrated. In the special case of image portions running vertically in the form of continuous bands it is practical to treat the absence of such recorded data as the presence of a reference component (elemental area) or line, provided that image data is not absent over extended regions of the recorded image area. This principle may in some cases be applied to a two-dimensional array of image components, where this has a well defined periodic absence of information in the elemental areas comprising the reference component array.

A system incorporating various aspects of the invention is illustrated with reference to FIG. 8. An array of convergent optical elements 40 is precisely located in front of surface 41 of position means 42. Surface 41 carries a sheet 43 of a photosensitive recording medium (photographic film), so that this is at, or close to, the focal plane of each of the convergent elements of array 40. An elongate aperture 44, in the partially shown housing of the recording apparatus, transmits image forming rays, from the scene to be recorded towards array 40.

A light source 45, used to illuminate the subject matter to be photographed, also supplies light to a combination of three fibre optical guides 46, 47 and 48. These fibres provide a means for relaying a portion of the light, which in use illuminates the scene, to known positions adjacent to aperture 44. The outputs from the guides, filtered by respective colour filters 49, 50 and 51 (or spectral selection means), provide reference light emitting means.

Whereas the embodiments described have been primarily concerned with the recording and processing of three-dimensional image data, it will be apparent to one skilled in the art that the use of a cellular image array need not be limited to this type of image. A wide variety of image data arranged in cellular form, alongside which reference data is provided in the form of geometric and/or recorded density information, can be recovered with greater precision than would be practical without applying the principles of this invention.

I claim:

1. Apparatus for use in the recording of a cellular image array, the apparatus comprising an array of convergent optical elements having a focal plane; means for positioning a photosensitive recording medium at or close to the focal plane; aperture means; and reference light emitting means adjacent said aperture means so that, in use, a cellular image array comprising both image data and reference marks is recorded on said recording medium, the cellular image array comprising an array of image components each associated with a respective reference mark spaced therefrom, said image components each being formed by rays passing through said aperture means and formed by rays passing through said aperture means and focused by a respective convergent element, and each respective reference mark being formed by rays from said light emitting means focused by the same convergent element as for the rays which form its associated image component.

2. Apparatus as claimed in claim 1 in which the aperture means is extended and, in use, the recorded image comprises three-dimensional image data.

3. Apparatus as claimed in claim 2 in which the aperture means is elongate.

4. Apparatus as claimed in claim 1 or 2 in which said reference light emitting means comprises means for relaying a portion of the light which, in use, illuminates the scene from which rays pass through said aperture means to form said image components.

5. Apparatus as claimed in claim 4 in which said relaying means comprises fibre optics.

6. Apparatus as claimed in claim 1 or 2 wherein there is a plurality of said light emitting means producing a corresponding plurality of reference marks associated with each image component.

7. Apparatus as claimed in claim 6 in which spectral selection means is used to provide that different ones of said light emitting means have different spectral components.

8. A method for recording a cellular image array comprising taking an array of convergent optical elements having a focal plane; positioning a photosensitive recording medium at or close to the focal plane; and exposing the recording medium to light rays via the array of convergent optical elements from an aperture and light emitting means adjacent the aperture to produce on the recording medium a cellular image array comprising both image data and reference marks, the cellular image array comprising an array of image components each associated with a respective reference mark spaced therefrom, said image components each being formed by rays passing through said aperture means and focused by a respective convergent element, and each respective reference mark being formed by rays from said light emitting means focused by the same convergent element as for the rays which form its associated image component.

9. A method as claimed in claim 8 wherein the image components and respective reference marks are recorded simultaneously.

10. A cellular image array recorded by the method of claims 8 or 9.

11. A cellular image array comprising a plurality of spaced image components recorded on photographic film in a substantially regular array, each image component being elongate and comprising three-dimensional image data, each image component of the three-dimensional image data comprising a super-pixel, each said super-pixel comprising a discrete or continuous plurality of elements of a corresponding plurality of perspectives of a recorded scene; and a corresponding plurality of respective reference marks on said film, each reference mark being adjacent to and spaced from its respective image component by the same distance as each other reference mark is spaced from its respective image component.

12. A cellular image array as claimed in claim 10 wherein each image component of the three-dimensional image data comprises a super-pixel, each said super-pixel comprising a discrete or continuous plurality of elements of a corresponding plurality of perspectives of a recorded scene.

13. A cellular image array as claimed in claim 12 in which each image component comprises a plurality of said super-pixels, each one of said plurality of super-pixels comprising respectively different spectral components of the image data.

14. An image array as claimed in claim 13 comprising black and white photographic emulsion.

15. A method of processing a cellular image array having a plurality of spaced image components recorded on photographic film in a substantially regular image array, each image component being elongate and comprising three-dimensional image data, and a corresponding plurality of respective reference marks on said film, each reference mark being adjacent to and spaced from its respective image mark by the same distance as each other reference component is spaced from its respective image component, comprising the steps of converting said image array into two-dimensional image density data; locating the plurality of reference marks within said data; identifying a corresponding plurality of the image components within said data by locating each image component relative to its respective reference mark; and providing positionally referenced image data for subsequent output.

16. A method as claimed in claim 15 in which providing referenced image data comprises transforming co-ordinates of the located image components, said transformation being derived from the locations of said reference marks.

17. A method as claimed in claim 15 in which providing referenced image data comprises combining data from a plurality of image components in order to provide a single element of processed image data.

18. A method as claimed in claim 15 in which providing referenced image data comprises mapping the density values of an image component relative to the density values of its respective reference mark and/or a plurality of reference marks.

19. A method as claimed in claim 16 in which the co-ordinate transformation includes a distortion to allow for the distortions of a subsequent image transfer process.

20. A method as claimed in claim 15 comprising performing a local transformation of image component data.

21. A method as claimed in claim 20 in which the image components comprise three-dimensional image data and the local transformation comprises reversing the sequence of individual pixel values within a super-pixel so that, in use, pseudoscopic image data is transformed into orthoscopic image data.

22. A method as claimed in claim 15 which comprises obtaining the recorded density data of at least one reference mark and deconvoluting the density data of a related image component by applying said recorded density data thereto.

23. A method as claimed in claim 15 which comprises obtaining the recorded shape data of at least one reference mark and deconvoluting the shape data of a related image component by applying said recorded shape data thereto.

24. A method as claimed in claim 15 which comprises obtaining the recorded spectral data of at least one reference mark and deconvoluting the spectral data of a related image component by applying said recorded spectral data thereto.

25. A cellular image array as claimed in claim 11 in which each image component comprises a plurality of said super-pixels, each one of said plurality of super-pixels comprising respectively different spectral components of the image data.

26. A cellular image array as claimed in claim 25 comprising black and white photographic emulsion.

* * * * *